United States Patent [19]
Woo

[11] Patent Number: 5,932,977
[45] Date of Patent: Aug. 3, 1999

[54] BLANKING CIRCUIT HAVING A PULSE WIDTH EXTENSION PART

[75] Inventor: Sang-Yean Woo, Kyeonggi-Do, Rep. of Korea

[73] Assignee: Daewoo Electronics Co., Ltd., Seoul, Rep. of Korea

[21] Appl. No.: 08/960,364

[22] Filed: Oct. 29, 1997

[30] Foreign Application Priority Data

Oct. 29, 1996 [KR] Rep. of Korea ................... 96-49676

[51] Int. Cl.⁶ ..................................................... H04N 3/24
[52] U.S. Cl. .......................................... 315/384; 348/637
[58] Field of Search ................................... 315/384, 408, 315/411; 348/634, 637

[56] References Cited

U.S. PATENT DOCUMENTS

| | | | |
|---|---|---|---|
| 3,950,672 | 4/1976 | Fukaya et al. | 315/389 |
| 4,228,464 | 10/1980 | Duijkers | 348/637 |
| 4,414,574 | 11/1983 | Verlinden | 348/707 |
| 4,536,793 | 8/1985 | Harshbarger et al. | |
| 4,652,920 | 3/1987 | Dietz. | |
| 4,767,971 | 8/1988 | Onozawa et al. | |
| 5,319,287 | 6/1994 | Furukawa | 315/397 |
| 5,465,032 | 11/1995 | Elgert et al. | 315/403 |
| 5,469,220 | 11/1995 | Kumada. | |

FOREIGN PATENT DOCUMENTS 62-102666 5/1987 Japan.
1120005 7/1968 United Kingdom.

OTHER PUBLICATIONS

Japio Abstract Accession No. 03605679 & JP 030268579 (Sharp) Nov. 29, 1991.

*Primary Examiner*—Edward P. Westin
*Assistant Examiner*—Shane R. Gardner
*Attorney, Agent, or Firm*—Jacobson, Price, Holman & Stern, PLLC

[57] ABSTRACT

A blanking circuit generates a blanking signal by using a vertical fly-back pulse and/or an output signal of a vertical IC. The blanking signal is superimposed on a grid control signal obtained from a fly-back transformer and then provided to a grid control terminal of a CRT. The blanking circuit has an output signal stabilization part to generate a stable signal by restricting a peak value of a signal generated from the vertical IC within a predetermined limit, a pulse width extension part to widen a pulse width of a vertical fly-back pulse generated from the vertical IC and having a constant amplitude and a constant pulse width, and a blanking signal generating part to generate a blanking signal from the signal superimposing the stable signal on the vertical fly-back pulse having a wide pulse width. The blanking signal is superimposed on an output signal of a fly-back transformer and provided to a grid control terminal of the cathode ray tube. Thus, the blanking signal kills the retrace lines shown in upper and lower parts of a screen.

7 Claims, 8 Drawing Sheets

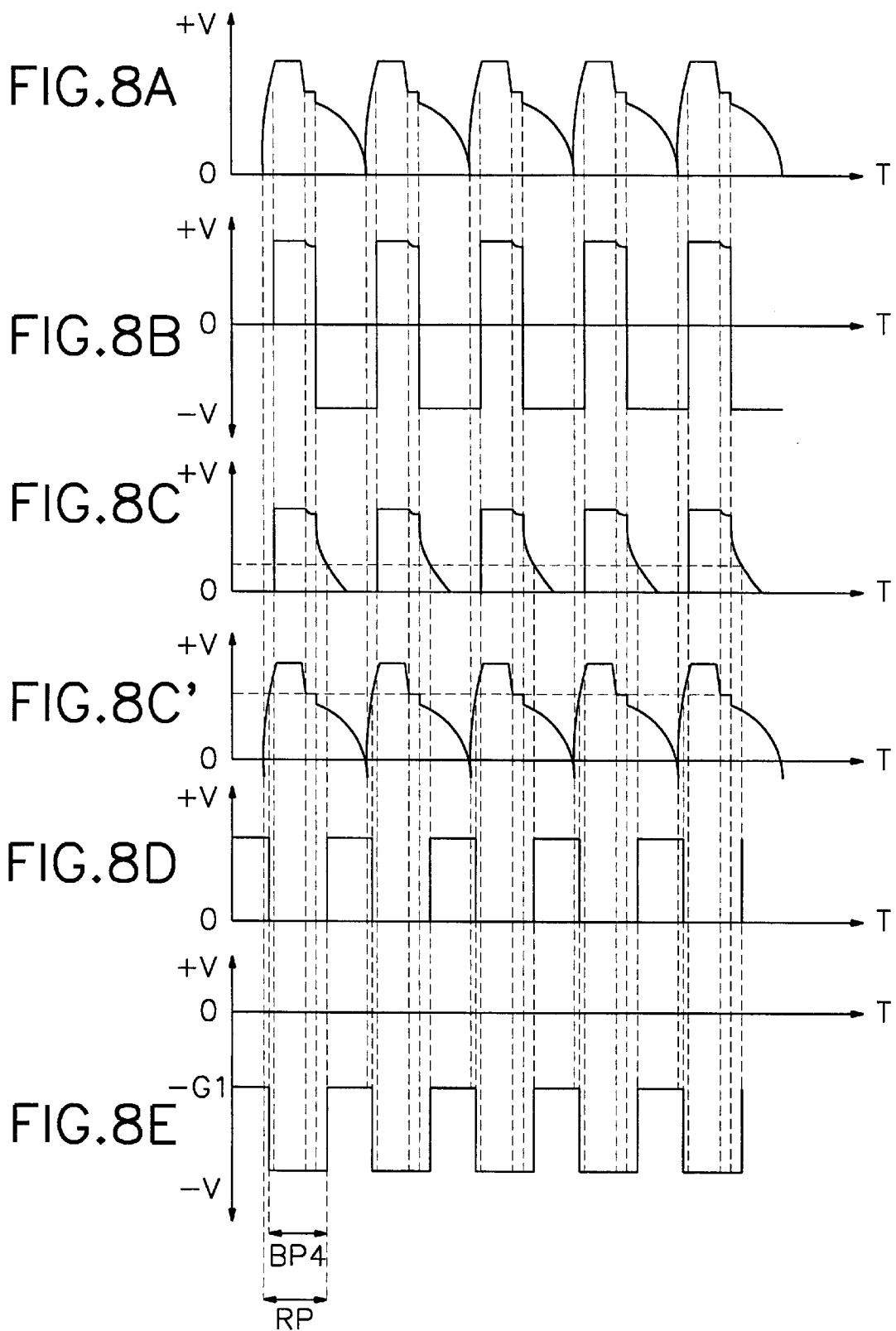

BLANKING CIRCUIT HAVING A PULSE WIDTH EXTENSION PART

BACKGROUND OF THE INVENTION

1. Field of the Invention

The present invention relates to a display apparatus having a cathode-ray tube (referred to as CRT), and more particularly to a blanking circuit to generate a blanking signal having a pulse width wider than a blanking period by use of a vertical fly-back pulse V.FBP and an output signal Vout of the vertical IC.

2. Description of the Prior Art

As an arbitrary point at a given moment in time, assume that an electron beam is directed toward an upper left side of a screen. Under an electromagnetic influence of a horizontal deflection yoke, the beam is made to move from left to right across the screen. Also, under an influence of a vertical yoke, it is pulled downward, producing a visible scanning line sloping downward to the right. At this point, the beam is deflected rapidly to the left side of the screen. This is called horizontal beam retrace. Retrace lines are blanked out and not seen by the viewer. When the beam reaches the left side of the screen, the screen becomes unblanked. When the beam reaches the bottom of the screen, the magnetic influence of the vertical yoke reverses and the beam begins to move upward. During this vertical retrace interval the beam is still being influenced by the horizontal deflection and continues to move upward in zigzag fashion until it reaches the top of the screen. This completes what is called the scanning of the field.

As is known, a display apparatus having the CRT is provided with a blanking circuit for cutting off the electron beam during horizontal and vertical blanking periods. The blanking circuit is designed to change a potential difference between a cathode and a screen grid of the CRT during the blanking periods. The electron beam emitted from the cathode is cut off, and the blanking circuit prevents the electron beam from reaching a phosphor layer coated on an inner surface of a face plate of the CRT. The blanking circuit increases the cathode potential or decreases the potential of the screen grid, thereby cutting off the CRT during the horizontal and vertical blanking periods. High-amplitude blanking pulses periodically interrupt a video to darken the CRT screen during vertical and horizontal retrace periods. Sync pulses are superimposed on the blanking pulses. Their function is to synchronize raster development with the video signals. The sync on the vertical blanking pedestal synchronizes a horizontal sweep generator during a vertical retrace interval and is provided sync for a vertical sweep. They occur during the vertical blanking interval that follows each field. Some picture information is, of course, "lost" to the viewer during vertical and horizontal retrace periods when the screen is blanked out, but this is not noticeable because of the short duration. However, this vertical retrace time is long enough for the beam to scan several horizontal lines. We can call them vertical retrace lines, meaning complete horizontal lines scanned during vertical fly-back. All lines scanned during vertical retrace are invisible, because the electron beam is cut off by blanking voltage during the vertical fly-back time. However, in the CRT, some sloping white lines(vertical retrace lines) appear in the screen when a degree of intensity of the video signal is weak, the screen is dark due to a degradation of the CRT, and the screen is made brighter by controlling the brightness thereof. The vertical retrace lines always appeared in the screen during the vertical blanking period just after the vertical scanning has been complete. Therefore, for the vertical retrace lines to disappear from the screen, it is required to prevent electron beams from being emitted during the vertical retrace period by superimposing the voltage generated in the retracing period of the vertical sawtooth wave from the vertical IC on the grid control signal and providing the superimposing signal into the CRT.

The conventional blanking circuit of the CRT is described below by referring the FIG. 1 and FIG. 2.

A vertical IC 10 is driven by a vertical driving signal VDS and provides a current to a deflection yoke coil. An output signal Vout is generated from the vertical IC 10. The output signal Vout superimposes on a negative vertical synchronizing signal −Vs and then is provided to a vertical deflection coil VD. FIG. 2A shows a wave form of the output signal superimposing on the negative vertical synchronizing signal, i.e., the wave form of the signal obtaining from a point (a) in the FIG. 1. The output signal Vout also is provided to a blanking circuit 30. The output signal Vout is filtered by a resistor R6 and a capacitor C6. FIG. 2B shows a wave form of the filtered signal, i.e., a wave form of the signal being obtained from a point (b) in the FIG. 1. A Zener diode D2 connected to the capacitor C6 clips away the AC coupled signal to obtain a stable voltage lower than the Zener voltage. FIG. 2C shows the wave form of the clipped signal, i.e., the wave form of the signal being obtained from a point (c) in the FIG. 1. A base terminal of a blanking transistor TR1 receives the clipped signal. The transistor TR1 performs a stable operation because the Zener diode D2 breaks the overvoltage. A collector terminal of the transistor Tr1 is connected to a voltage supply Vcc2 through a resistor R9 and also connected to a resistor R11. The resistor R11 is connected to a capacitor C7. The capacitor C7 is connected to a control grid of the CRT. FIG. 2D shows a wave form of the signal generated from the collector terminal of the blanking transistor TR1, i.e., a wave form of the signal being obtained from a point (d) in the FIG. 1. FIG. 2E shows a wave form of the collector signal filtered by the capacitor C7, i.e., a wave form of the signal being obtained from a point (e) in the FIG. 1. An emitter terminal of the blanking transistor TR1 is grounded. That is, the base terminal of the blanking transistor Tr1 has the pulses generated from the output signal Vout of the vertical IC during the retracing period. The signal obtained from the collector terminal of the transistor TR1, i.e., a blanking signal, superimposes on the grid control signal obtained from a fly-back transformer (referred to as FBT) 20. The control grid of the CRT has the superimposing signal. Therefore, during the retracing period the retrace lines disappear from the screen by providing the negative voltage with a large absolute value at the control grid.

However, the conventional blanking circuit has a problem that the retrace lines appear in the screen at a front porch and a back porch because the blanking signal generated from the conventional blanking circuit 30 has a pulse width BP1 smaller than the retracing period RP as shown in FIG. 2E.

SUMMARY OF THE INVENTION

Therefore, in the present invention to solve the above mentioned problem, it is an object of the present invention to provide a blanking circuit for generating the blanking signal having a pulse width wider than the conventional blanking signal.

To achieve the above object of the present invention a blanking circuit according to a first embodiment of the present invention comprises an output signal stabilization part to generate a stable signal by restricting a peak value of a signal generated from a vertical IC driven by a vertical driving signal within a predetermined limits, and a blanking signal generating part to generate a blanking signal having a predetermined pulse width from the stable signal. The output signal stabilization part has a first resistor connected to the output terminal of the vertical IC, and a first capacitor connected to the first resistor for AC coupling. The blanking signal generating part comprises a transistor that has a base terminal connected to the first capacitor, a grounded emitter terminal, and a collector terminal connected to a voltage supply through a current restriction resistor; a supply voltage dividing resistor connected with the collector terminal of the transistor; and a second resistor connected to the supply voltage dividing resistor and a second capacitor for AC coupling having one end connected to the second resistor and the opposite end connected to an output terminal of a fly-back transformer. The blanking circuit according to the first embodiment of the present invention kills the retrace lines showing on the lower part of the screen at the back porch by generating the blanking signal from the output signal of the vertical IC and providing the blanking signal to the grid control terminal.

A blanking circuit according to a second embodiment of the present invention comprises a pulse width extension part to widen a pulse width of a vertical fly-back pulse generated from a vertical IC driven by a vertical driving signal and has a constant amplitude and a constant pulse width, and a blanking signal generating part to generate a blanking signal from the vertical fly-back signal with the wide pulse width. The pulse width extension part comprises a first transistor in which a base terminal is connected to a fly-back pulse output terminal of the vertical IC through a bias resistor, and a collector terminal is also connected to the vertical fly-back pulse output terminal of the vertical IC; a diode having an anode connected to the emitter terminal of the first transistor and a cathode grounded through the first resistor; a first capacitor having an end connected to a cathode of the diode and the opposite end grounded; and a second resistor having an end connected to a cathode of the diode and the opposite end connected to the blanking signal generating part. The blanking signal generating part comprises a second transistor that has a base terminal connected to the second resistor, a grounded emitter terminal, and a collector terminal connected to a voltage supply through a current restriction resistor; a supply voltage dividing resistor connected between the collector terminal of the second transistor and the ground; and a third resistor connected and a second capacitor for AC coupling having one end connected to the third resistor and the opposite end connected to an output terminal of a fly-back transformer. The blanking circuit according to the second embodiment of the present invention kills the retrace lines showing on an upper part of the screen at the front porch by generating the blanking signal from the vertical fly-back pulse of the vertical IC having a constant amplitude and a constant period and providing the blanking signal to the control grid terminal.

A blanking circuit according to a third embodiment of the present invention comprises an output signal stabilization part to generate a stable signal by restricting a peak value of a signal, generated from a vertical IC driven by a vertical driving signal, within some predetermined limits; a pulse width extension part to widen a pulse width of a vertical fly-back pulse generated from the vertical IC and has a constant amplitude and a constant pulse width; and a blanking signal generating part to generate a blanking signal from the signal superimposing the stable signal with the vertical fly-back pulse having a wide pulse width. That is, the blanking circuit according to the third embodiment of the present invention kills the retrace lines showing on the lower and upper parts of the screen at the back porch and front porch by generating the blanking signal from the output signal and the vertical fly-back signal of the vertical IC and providing the blanking signal to the control grid terminal.

The blanking circuits according to the present invention generate the blanking signal having the pulse width wider than the pulse width BP1 of the conventional blanking signal by using the vertical fly-back pulse and/or output signal of the vertical IC for providing a current to a deflection yoke coil. The blanking circuits kill the retrace lines which appeared on the screen during the front porch and/or back porch by providing the blanking signal to the control grid terminal of the CRT.

BRIEF DESCRIPTION OF THE DRAWINGS

The above objects and other advantages of the present invention will become more apparent by describing in detail preferred embodiments thereof with reference to the attached drawings in which:

FIGS. 8A through 8E show waveforms of each point of the blanking circuit according to the third embodiment of the present invention.

DETAILED DESCRIPTION OF THE PREFERRED EMBODIMENTS

Figure 1:
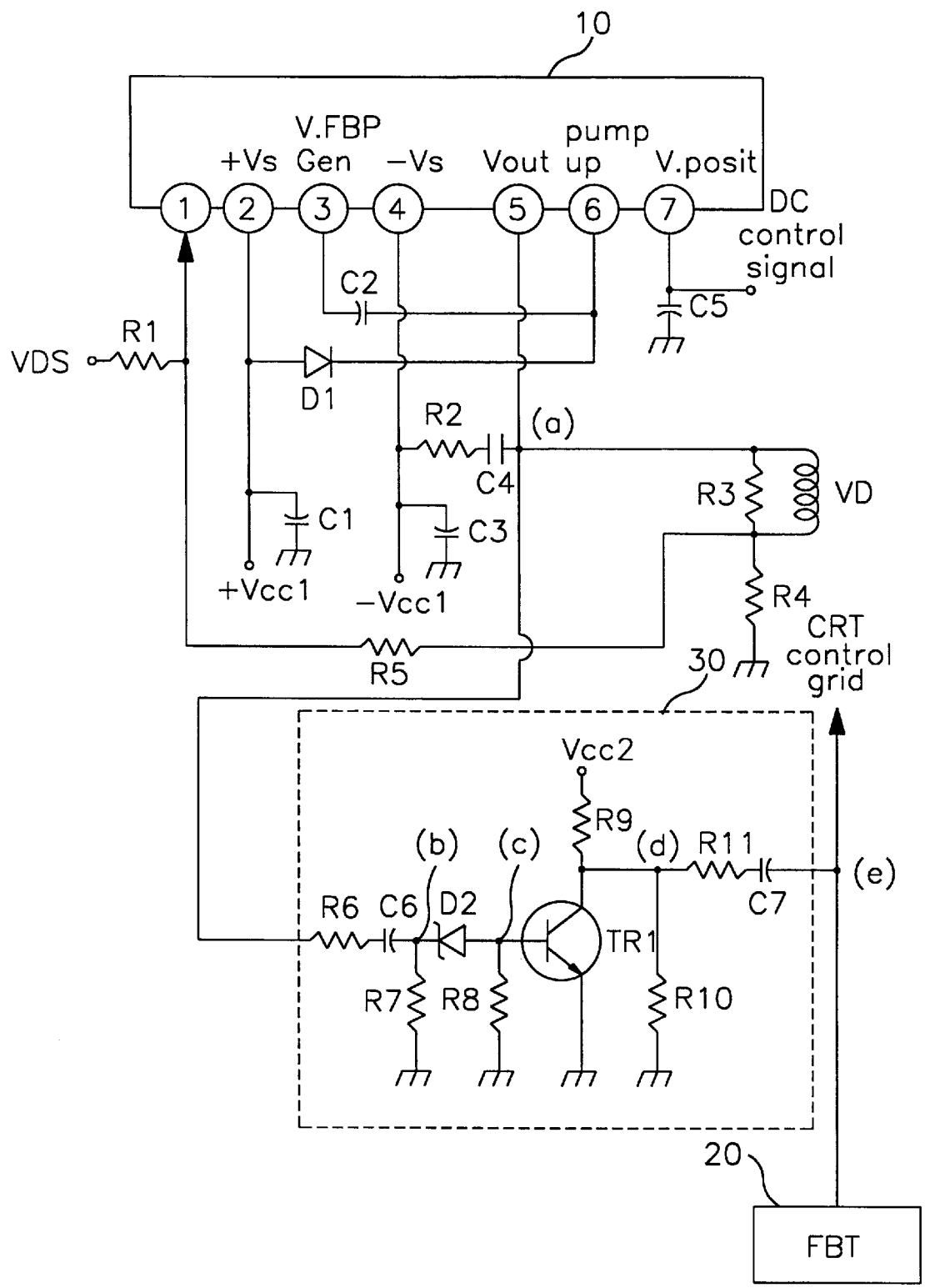
FIG. 1 is a circuit diagram showing the conventional blanking circuit.
Figure 2:
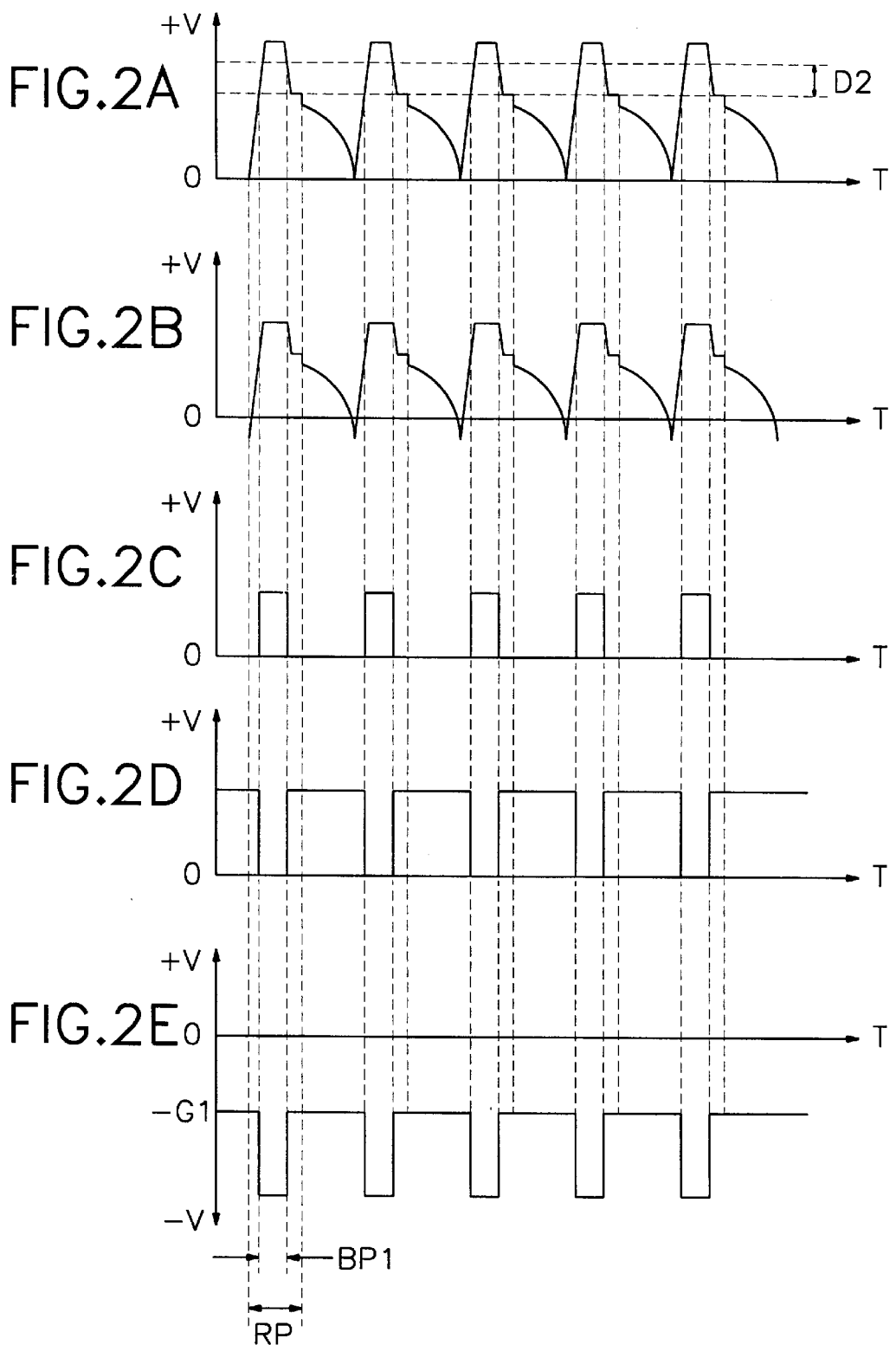
FIGS. 2A through 2E show the waveforms of each point of the conventional blanking circuit.
Figure 3:
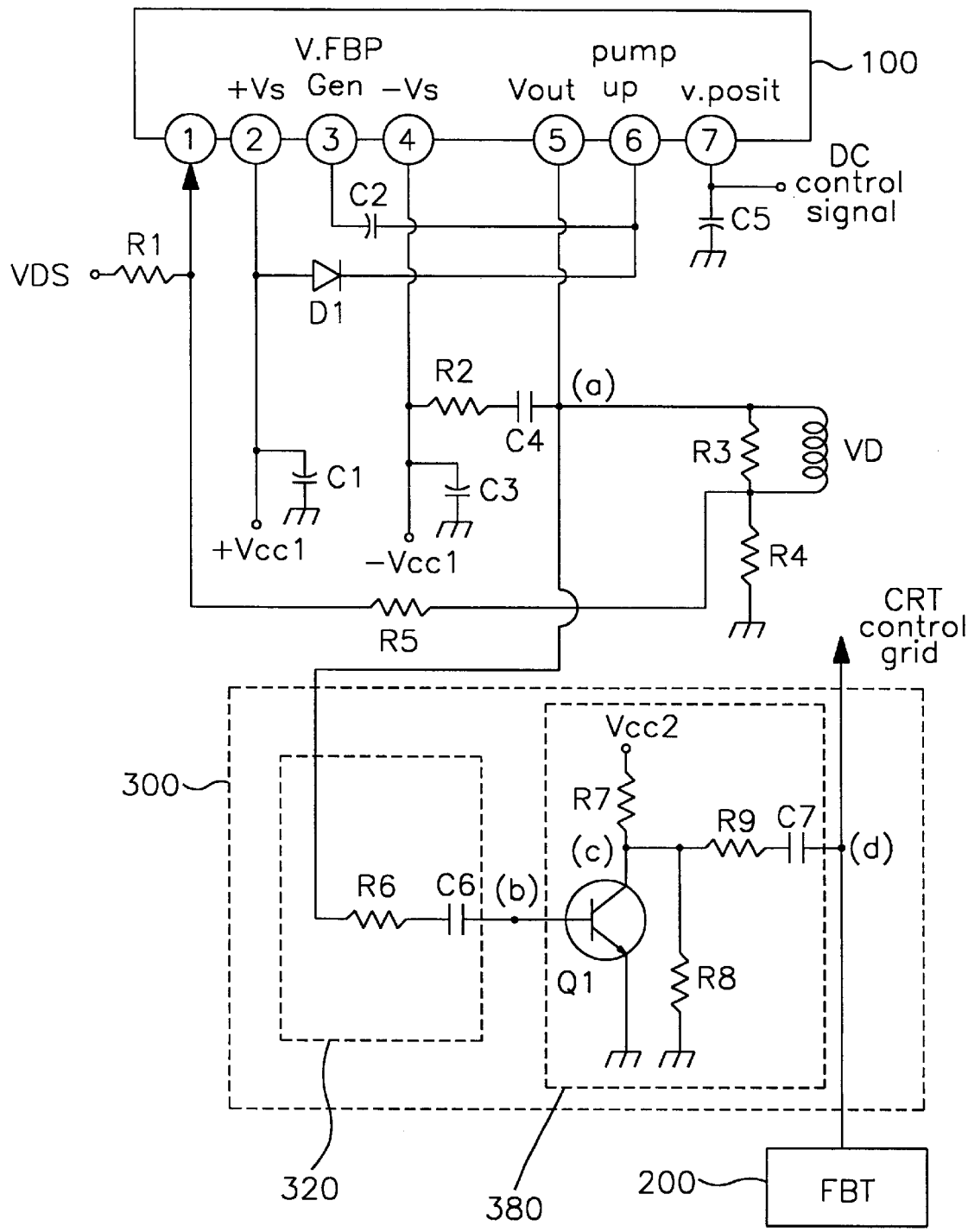
FIG. 3 is a circuit diagram showing a blanking circuit according to a first embodiment of the present invention.
Figure 4:
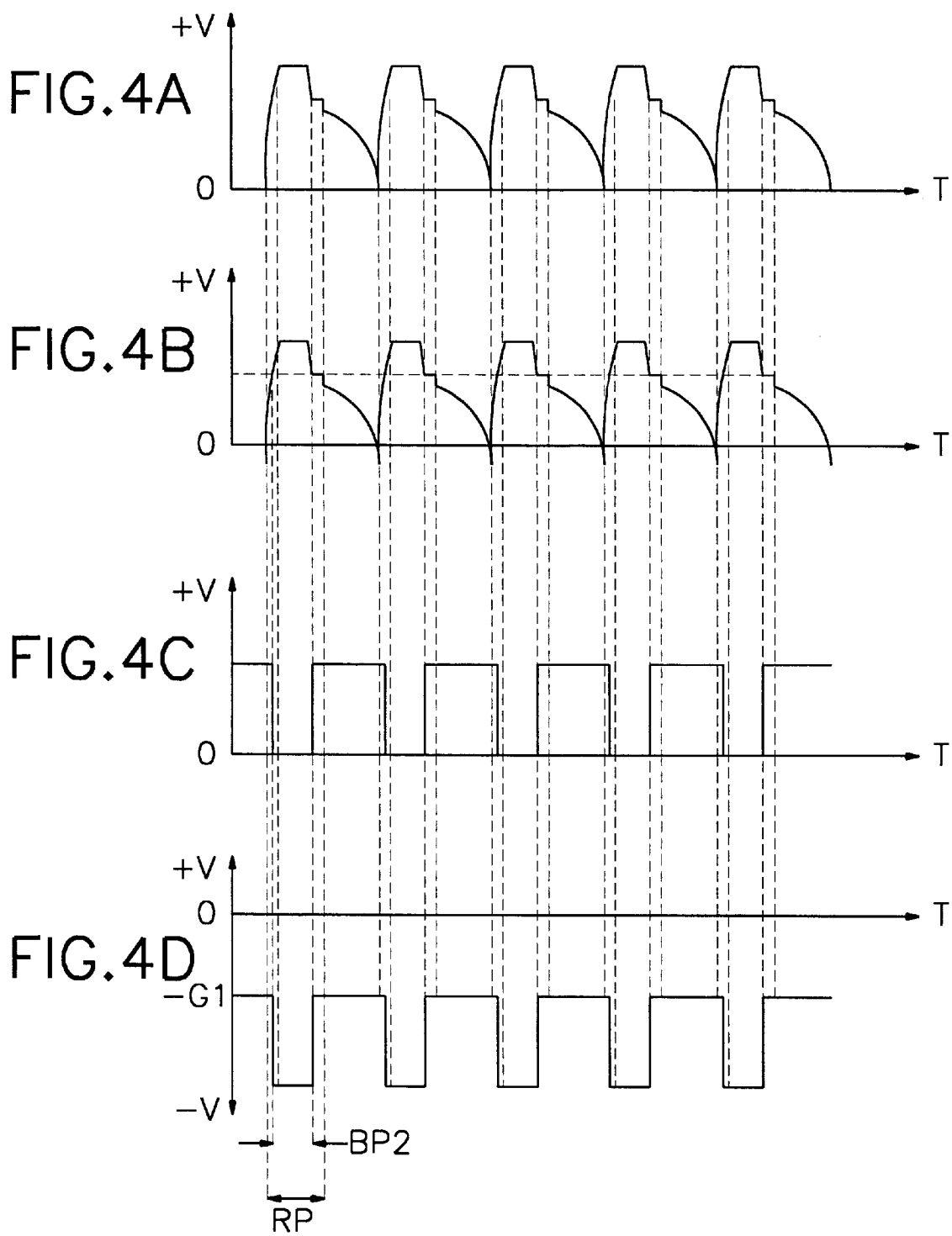
FIGS. 4A through 4D show waveforms of each point of the blanking circuit according to the first embodiment of the present invention.

Embodiments of the present invention now will be described below with reference to FIGS. 3 through 8. FIG. 3 is a circuit diagram showing a blanking circuit according to a first embodiment of the present invention, and FIGS. 4A through 4D show waveforms of each point of the blanking circuit according to the first embodiment of the present invention.

A vertical integrated circuit (IC) 100 has a number of terminals. A vertical positioning terminal 7 of a vertical IC 100 is grounded through a capacitor C5. We detect DC control signal from the vertical positioning terminal 7 of the vertical IC 100. A vertical fly back pulse generating terminal 3 of the vertical IC 100 is connected to the pump up terminal 6 by a capacitor C2. A terminal 2 for a positive vertical synchronizing signal +Vs is connected to a pump up terminal 6 by the diode D1. A terminal 2 for a positive vertical synchronizing signal +Vs is connected to a positive power supplying part +Vcc1 and is also grounded through a capacitor C1. A terminal 4 for a negative vertical synchronizing signal −Vs is connected to a negative power supplying part −Vcc1 and is also grounded through a capacitor C3. A terminal 4 for a negative vertical synchronizing signal −Vs is connected to an output terminal Vout through a resistor R2 and a capacitor C4. An output terminal Vout is also connected to an end of a vertical deflection coil VD. A vertical output signal is provided to a vertical deflection coil VD. Both ends of the vertical deflection coil VD are connected to a resistor R3. The other end of the vertical deflection coil VD is grounded through a resistor R4 and is also connected to an input terminal 1 through a resistor R5. A resistor R1 is connected to an end of a resistor R5. A vertical deflection signal VDS is provided to a television system (not shown) through a resistor R1. A vertical fly back pulse generating terminal 3 is connected to a blanking circuit 300.

Hereinafter, like elements, which have appeared in FIG. 3, respectively, are designated by like members, and the description thereof is omitted.

A blanking circuit 300 according to the first embodiment of the present invention has an output signal stabilization part 320 connected to an output terminal Vout of a vertical IC 100 driven by a vertical driving signal. The output signal stabilization part 320 has a first resistor R6 and a first capacitor C6 for AC coupling. The first capacitor C6 is connected to the first resistor R6. The output signal stabilization part 320 is connected to a blanking signal generating part 380. The blanking signal generating part 380 has a transistor Q1 having a base terminal connected to the first capacitor C6. An emitter terminal of the transistor Q1 is grounded. A collector terminal of the transistor Q1 is connected to a voltage supply Vcc2 through a current restriction resistor R7. The current restriction resistor R7 is to prevent the transistor Q1 from over voltage. One end of a supply voltage dividing resistor R8 is connected to the collector terminal of the transistor Q1, and the opposite end thereof is grounded. The voltage dividing resistor R8 determines a peak to peak voltage Vp-p of a blanking signal. A second resistor R9 is connected between the collector terminal of the transistor Q1 and a second capacitor C7. The opposite end of the second capacitor C7 is connected to an output terminal of a fly-back transformer 200. The output terminal of the fly-back transformer 200 is connected to a grid control terminal of a cathode ray tube CRT (unshown in figures).

Next, the operation and effect of the blanking circuit according to the first embodiment of the present invention as constructed above will be described below.

When the blanking period starts, the output signal Vout generated from the vertical IC 100 as shown in FIG. 4A is provided to the output signal stabilization part 320. The output signal stabilization part 320 filters the output signal Vout. The filtered signal is shown in FIG. 4B. When the filtered signal is provided to the base terminal of the transistor Q1, the base terminal and the emitter terminal of the transistor Q1 are conductive. Therefore, the supply voltage Vcc2 is provided to the transistor Q1 through the current restriction resistor R7 so that the transistor Q1 is active. The waveform as shown in FIG. 4C is obtained from the collector terminal of the transistor Q1. That is, the base terminal of the transistor Q1 receives the signal filtering the output signal Vout of the vertical IC 100 by the first resistor R6 and the first capacitor C6 during the retrace period. The collector terminal of the transistor Q1 has the pulses to be superimposed on the output signal of the fly-back transformer 200. The supply voltage dividing resistor R8 sets the amplitude of the pulses. The pulses are filtered by the second resistor R9 and the second capacitor C7. The filtered signal is a blanking signal. The blanking signal superimposes on the grid control voltage −G1 generated from the fly-back transformer 200, and then is provided to the grid control terminal. FIG. 4D shows the signal provided to the grid control terminal. In FIG. 4D, a reference character RP represents the retracing period, and a reference character BP2 represents the blanking period. The blanking period BP2 according to the first embodiment of the present invention is longer than the conventional blanking period BP1. That is, the LOW level term of the blanking signal according to the first embodiment of the present invention is increased by decreasing a back porch of the conventional blanking signal. During the retrace period the blanking signal of the blanking circuit according to the first embodiment of the present invention kills the retrace lines shown in the lower part of the screen.

Figure 5:
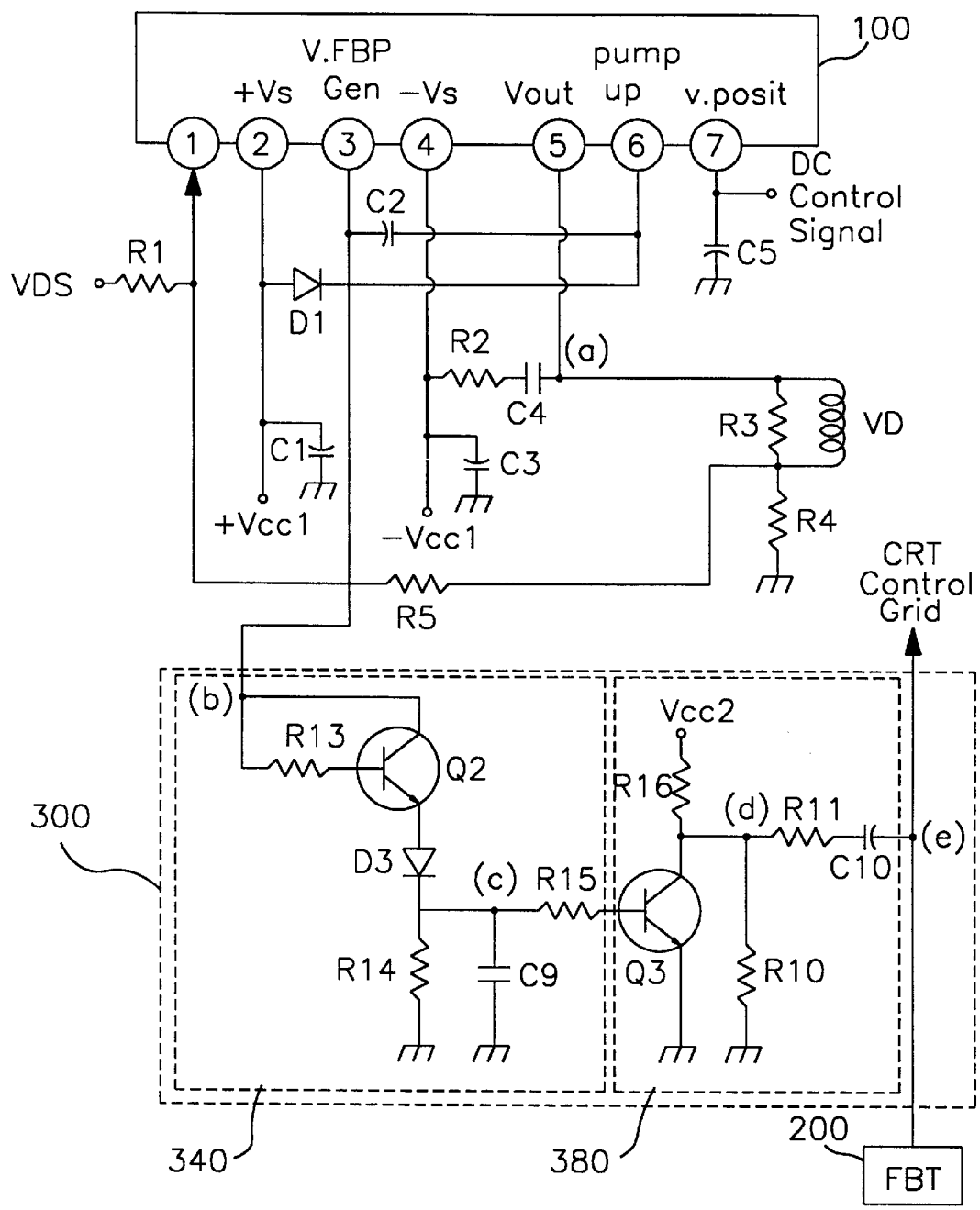
FIG. 5 is a circuit diagram showing a blanking circuit according to a second embodiment of the present invention.
Figure 6:
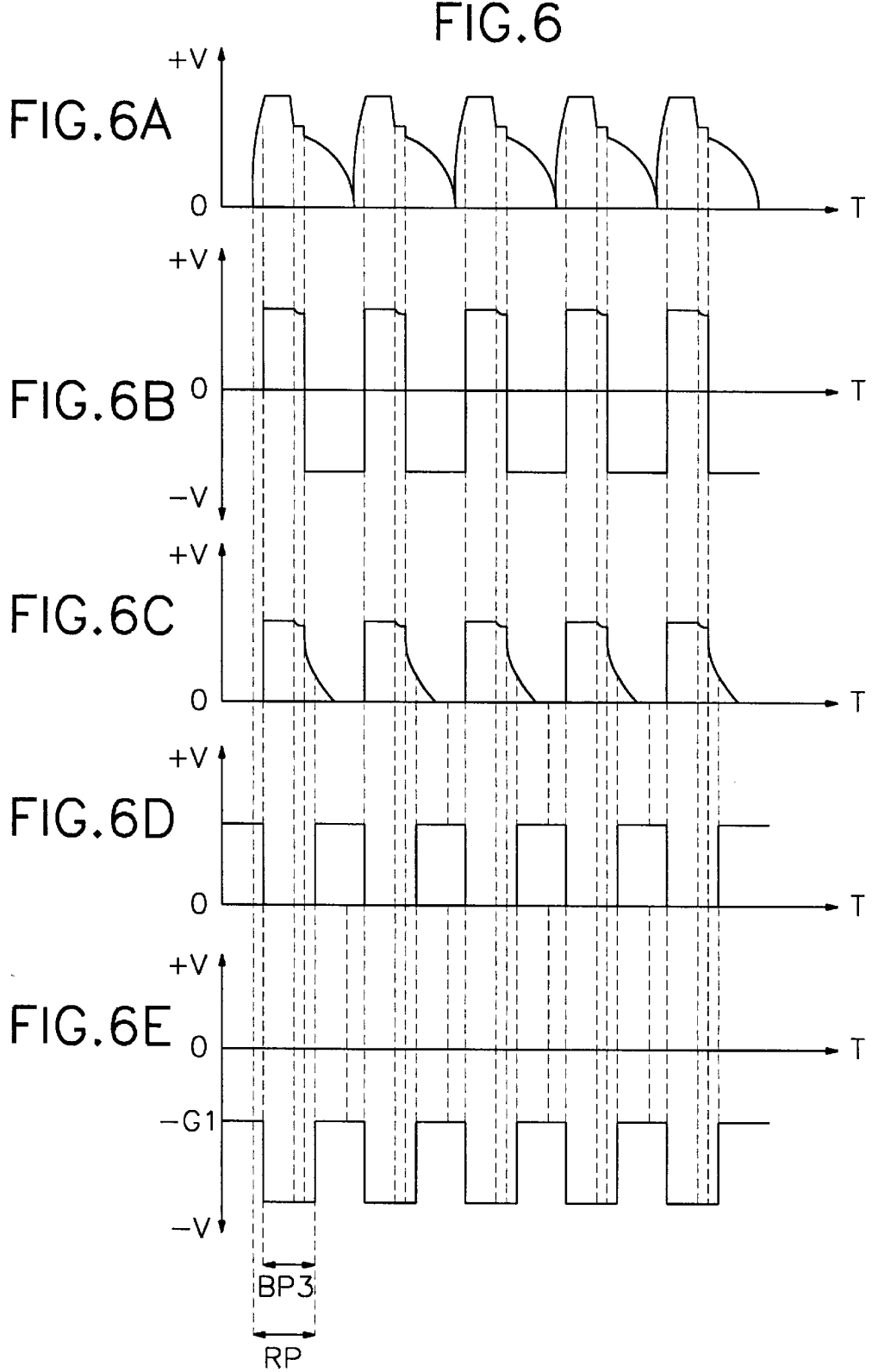
FIGS. 6A through 6E show waveforms of each point of the blanking circuit according to the second embodiment of the present invention.

A blanking circuit according to the second embodiment of the present invention now will be described with reference to FIG. 5 and FIGS. 6A through 6E. FIG. 5 is a circuit diagram showing the blanking circuit according to the second embodiment of the present invention, and FIGS. 6A through 6E show waveforms of each point of the blanking circuit according to the second embodiment of the present invention.

The blanking circuit 300 according to the second embodiment of the present invention has a pulse width extension part 340 connected to a vertical fly-back pulse output terminal of the vertical IC 100 driven by the vertical driving signal. The vertical fly-back pulse V.FBP has a constant amplitude and a constant pulse width. The pulse width extension part 340 has a first transistor Q2 having a base terminal connected to a vertical fly-back pulse output terminal of the vertical IC 100 through a bias resistor R13 and a collector terminal connected to the vertical fly-back pulse output terminal. An emitter terminal of the first transistor Q2 is connected to an anode of a diode D3 to prevent the first transistor Q2 from discharging in reverse direction. A cathode of the diode D3 is respectively grounded through a first resistor R14 and a first capacitor C9 composing a discharging path. The opposite end of the first capacitor C9 is grounded. A second resistor R15 is connected between a cathode of the diode D3 and a blanking signal generating part 380. The blanking signal generating part 380 has a second transistor Q3 having a base terminal connected to one end of the second resistor R15. An emitter terminal of the second transistor Q3 is grounded, and a collector terminal thereof is connected to a voltage supply Vcc2 through a current restriction resistor R16. A supply voltage dividing resistor R10 is connected to the collector terminal of the second transistor Q3. A third resistor R11 is also connected to the collector terminal of the second transistor Q3. One end of the third resistor R11 is connected to a second capacitor C10. The opposite end of the second capacitor C10 is connected to a fly-back transformer 200. The output terminal of the fly-back transformer 200 is connected to a grid control terminal of the CRT.

The operation and effect of the blanking circuit according to the second embodiment of the present invention as constructed above will be described. FIG. 6A shows the output signal Vout of the vertical IC for comparing the conventional blanking signal with the blanking signal generated from the blanking circuit according to the second embodiment of the present invention. When the blanking period starts, the vertical fly-back pulse V.FBP generated from the vertical IC 100 as shown in FIG. 6B is provided to the base terminal and the collector terminal of the first transistor Q2. Therefore, an output signal of the emitter terminal of the first transistor Q2 passes through the diode D3, and then a falling edge of a positive part of the signal is tapered down. A negative part of the signal is killed by the first capacitor C9, and then the signal obtained from the diode D3 has a waveform as shown in FIG. 6C. When, in the retrace period, the pulses as shown in FIG. 6C are provided at the base terminal of the second transistor Q3 through the second resistor R15, the second transistor Q3 is active. Thus, the collector terminal of the second transistor Q3 has the pulse as shown in FIG. 6D. The pulses have an amplitude decided by the voltage dividing resistor R10, and are filtered by the third resistor R11 and the second capacitor C10. The filtered signal is superimposed on the grid control voltage –G1 generated from the fly-back transformer 200, and provided to the grid control terminal of the CRT. FIG. 6E shows the waveform of the superimposed signal. In FIG. 6E, a reference character BP3 represents the blanking period. The blanking period of the blanking signal obtained from the blanking circuit according to the second embodiment of the present invention is longer than the conventional blanking period BP1. That is, the LOW level term of the blanking signal is increased by decreasing the front porch of the conventional blanking signal. During the retrace period the blanking signal of the blanking circuit according to the second embodiment of the present invention kills the retrace lines shown in the upper part of the screen.

Figure 7:
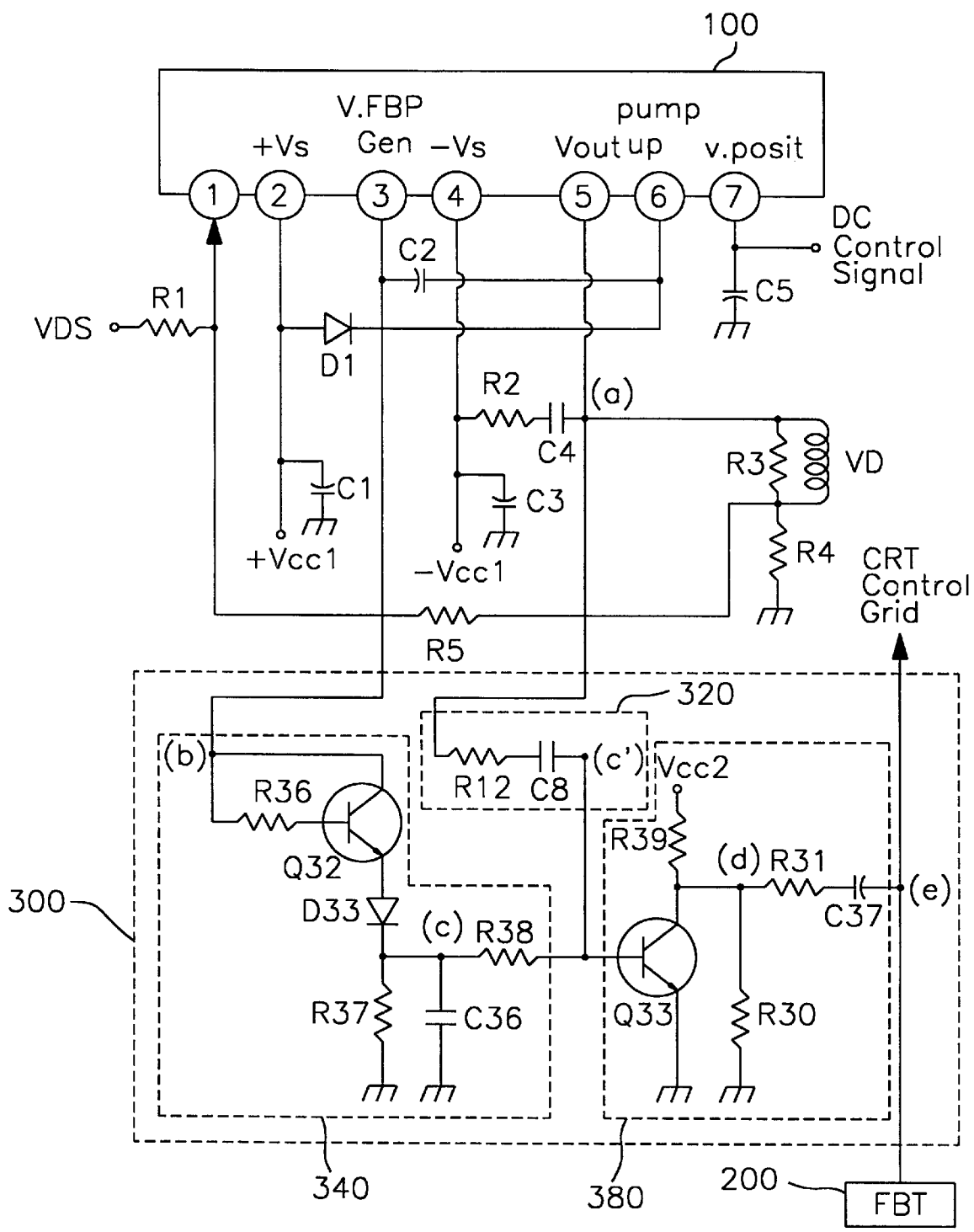
FIG. 7 is a circuit diagram showing a blanking circuit according to a third embodiment of the present invention.

A blanking circuit according to the third embodiment of the present invention now will be described with reference to FIG. 7 and FIGS. 8A through 8E. FIG. 7 is the circuit diagram showing the blanking circuit according to the third embodiment of the present invention, and FIGS. 8A through 8E show waveforms of each point of the blanking circuit according to the third embodiment of the present invention.

A blanking circuit 300 according to the third embodiment of the present invention has a vertical output signal stabilization part 320 connected to an output terminal Vout of a vertical IC 100 driven by a vertical driving signal. The vertical output signal stabilization part 320 has a first resistor R12 and a first capacitor C8 for AC coupling. The first resistor R12 is connected between the output terminal Vout and the first capacitor C8. The vertical output signal stabilization part 320 is connected to a blanking signal generating part 380. The blanking circuit 300 also has a pulse width extension part 340 connected to a vertical fly-back pulse output terminal of the vertical IC 100. A vertical fly-back pulse V.FBP has a constant amplitude and a constant pulse width. The pulse width extension part 340 has a first transistor Q32 having a base terminal connected to the vertical fly-back pulse output terminal of the vertical IC 100 through a bias resistor R36 and a collector terminal connected to the vertical fly-back pulse output terminal. An emitter terminal of the first transistor Q32 is connected to an anode of a diode D32 to prevent the first transistor Q32 from discharging in reverse direction. A cathode the diode D33 is grounded through a second resistor R37. A second capacitor C36 composing a discharging path is connected to the cathode of the diode D33. The opposite end of the second capacitor C36 is grounded. One end of a third resistor R38 is connected to the cathode of the diode D33. The opposite end of the third resistor R38 is connected to the blanking signal generating part 380. The blanking signal generating part 380 has a second transistor Q33. One end of the first capacitor C38 is connected to a base terminal of the second transistor Q33. An emitter terminal of the second transistor Q33 is grounded, and a collector terminal is connected to a voltage supply Vcc2 through a current restriction resistor R39. A supply voltage dividing resistor R30 is connected to the collector terminal of the second transistor Q33. A fourth resistor R31 is connected to the collector terminal of the second capacitor Q33. One end of the fourth resistor R31 is connected to a third capacitor C37. The opposite end of the third capacitor C37 is connected to an output terminal of a fly-back transformer 200. The output terminal of the fly-back transformer 200 is connected to a grid control terminal of the CRT.

The operation and effect of the blanking circuit according to the third embodiment of the present invention as constructed above will be described below.

When the blanking period starts, the output signal Vout generated from the vertical IC 100 as shown in FIG. 8A is provided to the vertical output signal stabilization part 320. The vertical output signal stabilization part 320 filters off the output signal Vout. The filtered signal having a waveform as shown in FIG. 8C' is provided to the base terminal of the second transistor Q33. On the other hand, the vertical fly-back pulse V.FBP generated from the vertical IC 100 as shown in FIG. 8B is provided to the base terminal and the collector terminal of the first transistor Q32. Therefore, the first transistor Q32 is active, and the emitter terminal of the first transistor Q32 has the output signal. The output signal passes through the diode D33, and then a falling edge of a positive part of the output signal is tapered down. A negative part of the signal is killed by the second capacitor C36, and then the signal obtained from the diode D33 has a waveform as shown in FIG. 8C. The pulse generating in the retrace period as shown in FIG. 8C is superimposed on the filtered signal through the third resistor R38, and then the base terminal of the second transistor Q33 has the superimposed signal. The second transistor Q33 is active by the supply voltage Vcc2. Thus, the collector terminal of the second transistor Q33 has the pulse as shown in FIG. 8D. The amplitude of the pulse signal is determined by the voltage dividing resistor R30, and filtered by the fourth resistor R31 and the third capacitor C37. The filtered signal is superimposed on the grid control voltage –G1 generated from the fly-back transformer 200, and provided to the grid control terminal of the CRT. FIG. 8E shows the waveform of the superimposed signal. In FIG. 8E, a reference character BP4 represents the blanking period of the blanking signal obtained from the blanking circuit according to the third embodiment of the present invention. The blanking period BP4 is longer than the conventional blanking period BP1. That is, the LOW level term is increased by decreasing the front porch and the back porch of the conventional blanking signal. Therefore, the blanking signal according to the third embodiment of the present invention kills the retrace lines shown in the upper and lower parts of the screen during the retrace period.

As described above the blanking circuits according to the present invention generate the blanking signals having the pulse width wider than the conventional blanking signal by using the vertical fly-back pulse V.FBP and/or the output signal of the vertical IC. The grid control terminal of the CRT has the signal superimposing the blanking signal on the grid control signal –G1, and then the retrace lines showing the upper and lower parts of the screen are killed.

In the above, the present invention is described in detail by using the preferred embodiment, but the invention is not limited in the above embodiment. It should be obvious to people skilled in the conventional art that modifications can be made to the invention as described above without departing from the spirit or the scope of the invention. However the invention is limited by accompanying claims as below.

What is claimed is:

1. A blanking circuit having a pulse width extension part comprising:

a pulse width extension part to widen a pulse width of a vertical fly-back pulse generated from a vertical IC driven by a vertical driving signal and having a constant amplitude and a constant pulse width; and a blanking signal generating part to generate a blanking signal from the vertical fly-back signal with the wide pulse width;

wherein said pulse width extension part comprises a first transistor having a base terminal connected to a fly-back pulse output terminal of the vertical IC through a bias resistor, and a collector terminal connected to the vertical fly-back pulse output terminal of the vertical IC; a diode having an anode connected to an emitter terminal of the first transistor and a cathode grounded through a first resistor; a first capacitor having an end connected to the cathode of the diode and the opposite end grounded; and a second resistor having an end connected to the cathode of the diode and the opposite end connected to the blanking signal generating part.

2. The blanking circuit having a pulse width extension part as claimed in claim 1, wherein said blanking signal generating part comprises:

a second transistor having a base terminal connected to the second resistor, a grounded emitter terminal, and a collector terminal connected to a voltage supply through a current restriction resistor;

a supply voltage dividing resistor connected to the collector terminal of the second transistor; and a third resistor connected to the collector terminal of the second transistor and a second capacitor for AC coupling having one end connected to the third resistor and the opposite end connected to an output terminal of a fly-back transformer.

3. A blanking circuit having a pulse width extension part comprising:

an output signal stabilization part to generate a stable signal by restricting a peak value of a signal, which is generated from a vertical IC driven by a vertical driving signal, within a predetermined limit;

a pulse width extension part to widen a pulse width of a vertical fly-back pulse generated from a vertical IC and having a constant amplitude and a constant pulse width; and a blanking signal generating part to generate a blanking signal from the signal superimposing the stable signal on the vertical fly-back pulse having a wide pulse width, wherein said pulse width extension part comprises:
a first transistor having a base terminal connected to a fly-back pulse output terminal of the vertical IC through a bias resistor and a collector terminal connected to a fly-back pulse output terminal of the vertical IC;

a diode having an anode connected to an emitter terminal of the first transistor and a cathode grounded through a first resistor;

a first capacitor having an end connected to the cathode of the diode and the opposite end grounded; and a second resistor having one end connected to the cathode of the diode and the opposite end connected to the blanking signal generating part.

4. The blanking circuit having a pulse width extension part as claimed in claim 3, wherein said output signal stabilization part comprises:

a third resistor connected to an output terminal of the vertical IC; and a second capacitor connected between the third resistor for AC coupling and the blanking signal generating part.

5. The blanking circuit having a pulse width extension part as claimed in claim 4, wherein said blanking signal generating part comprises:

a second transistor that has a base terminal connected to the second capacitor, a grounded emitter terminal, and a collector terminal connected to a voltage supply through a current restriction resistor;

a supply voltage dividing resistor connected to the collector terminal of the second transistor; and a fourth resistor connected to the collector terminal of the second transistor and a third capacitor for AC coupling having one end connected to the fourth resistor and the opposite end connected to an output terminal of a fly-back transformer.

6. A blanking circuit having a pulse width extension part comprising:

a pulse width extension part to widen a pulse width of a vertical fly-back pulse generated from a vertical IC driven by a vertical driving signal and having a constant amplitude and a constant pulse width, wherein said pulse width extension part comprises:
a first transistor having a base terminal connected to a fly-back pulse output terminal of the vertical IC through a bias resistor, and a collector terminal connected to a fly-back pulse output terminal of the vertical IC;

a diode having an anode connected to an emitter terminal of the first transistor and a cathode grounded through the first resistor;

a first capacitor having one end connected to the cathode of the diode and the opposite end grounded; and a second resistor having one end connected to the cathode of the diode and the opposite end connected to the blanking signal generating part; and a blanking signal generating part to generate a blanking signal from the vertical fly-back signal with the wide pulse width, wherein said blanking signal generating part comprises:
a second transistor having a base terminal connected to the second resistor, a grounded emitter terminal, and a collector terminal connected to a voltage supply through a current restriction resistor;

a supply voltage dividing resistor connected to the collector terminal of the second transistor;

a third resistor connected to the collector terminal of the second transistor; and a second capacitor for AC coupling having one end connected to the third resistor and the opposite end connected to an output terminal of a fly-back transformer.

7. A blanking circuit having a pulse width extension part comprising:

an output signal stabilization part to generate a stable signal by restricting a peak value of a signal, which is generated from a vertical IC driven by a vertical driving signal, within a predetermined limit, wherein said output signal stabilization part comprises:
a first resistor connected to an output terminal of the vertical IC; and a first capacitor connected to the first resistor for AC coupling;

a pulse width extension part to widen a pulse width of a vertical fly-back pulse generated from a vertical IC and having a constant amplitude and a constant pulse width, wherein said pulse width extension part comprises:
- a first transistor having a base terminal connected to a fly-back pulse output terminal of the vertical IC through a bias resistor and a collector terminal connected to a fly-back pulse output terminal of the vertical IC;
- a diode having an anode connected to an emitter terminal of the first transistor and a cathode grounded through the second resistor;
- a second capacitor having one end connected to the cathode of the diode and the opposite end grounded; and
- a third resistor having one end connected to the cathode of the diode and the opposite end connected to a blanking signal generating part; and the blanking signal generating part to generate a blanking signal from the signal superimposing the stable signal on the vertical fly-back pulse having a wide pulse width, wherein said blanking signal generating part comprises:
- a second transistor having a base terminal connected to the first capacitor, a grounded emitter terminal, and a collector terminal connected to a voltage supply through a current restriction resistor;
- a supply voltage dividing resistor connected to the collector terminal of the second transistor;
- a fourth resistor connected to the collector terminal of the second transistor; and
- a third capacitor for AC coupling having one end connected to the fourth resistor and the opposite end connected to an output terminal of a fly-back transformer.

* * * * *